(12) United States Patent
Casagrande

(10) Patent No.: US 8,996,147 B2
(45) Date of Patent: Mar. 31, 2015

(54) DYNAMICALLY UPDATED AUDIO JUKE BOX

(75) Inventor: Steve Casagrande, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 809 days.

(21) Appl. No.: 12/580,992

(22) Filed: Oct. 16, 2009

(65) Prior Publication Data

US 2011/0093101 A1    Apr. 21, 2011

(51) Int. Cl.
| | | |
|---|---|---|
| *G06F 17/00* | (2006.01) | |
| *G06F 17/30* | (2006.01) | |
| *G06Q 30/00* | (2012.01) | |
| *G06Q 30/06* | (2012.01) | |
| *G11B 27/034* | (2006.01) | |
| *G11B 27/10* | (2006.01) | |
| *G11B 27/28* | (2006.01) | |
| *G11B 27/32* | (2006.01) | |

(52) U.S. Cl.
CPC .... *G06F 17/30749* (2013.01); *G06F 17/30761* (2013.01); *G06F 17/30772* (2013.01); *G06Q 30/00* (2013.01); *G06Q 30/0601* (2013.01); *G11B 27/034* (2013.01); *G11B 27/105* (2013.01); *G11B 27/28* (2013.01); *G11B 27/329* (2013.01)
USPC .......................................................... 700/94

(58) Field of Classification Search
CPC .................... G06F 17/30017; G06F 17/30772; H04L 65/4084; H04L 65/60; G11B 2020/10768; G11B 20/10; G11B 20/10527
USPC .......................................................... 700/94
See application file for complete search history.

(56) References Cited

U.S. PATENT DOCUMENTS

| | | | | |
|---|---|---|---|---|
| 6,502,194 | B1* | 12/2002 | Berman et al. ................... | 726/28 |
| 7,028,082 | B1* | 4/2006 | Rosenberg et al. ........... | 709/223 |
| 7,333,864 | B1* | 2/2008 | Herley ............................ | 700/94 |
| 2001/0030660 | A1* | 10/2001 | Zainoulline ................... | 345/720 |
| 2003/0097338 | A1* | 5/2003 | Mankovich et al. ............ | 705/64 |
| 2004/0138948 | A1* | 7/2004 | Loomis ........................... | 705/14 |
| 2006/0155400 | A1* | 7/2006 | Loomis .......................... | 700/94 |

* cited by examiner

*Primary Examiner* — Andrew C Flanders
(74) *Attorney, Agent, or Firm* — Seed IP Law Group PLLC

(57) ABSTRACT

Embodiments discussed herein are directed to an apparatus and method for providing a library of audio files. In one embodiment, a receiver records a number of music tracks or other audio files from broadcasts or other transmissions that are sent across a number of channels. The receiver may be operable to receive a number of audio and/or video channels. The audio tracks may be recorded from the audio channels and stored on the receiver, when the receiver is not otherwise being used. In this way, the receiver accumulates a number of audio tracks that may be played back by a user at a convenient time. The receiver may adapt to record certain tracks or channels based on choices made by a user. In certain embodiments, a user may enter one or more preferences that cause the receiver to record certain tracks or channels.

19 Claims, 8 Drawing Sheets

| MENU | MENU | NOW PLAYING |
|---|---|---|
| CHANNELS<br>JUKEBOX<br>PREFERENCES<br>PLAYBACK | • RECORD<br>• DO NOT RECORD | ART WORK |

| CHANNEL | TITLE |
|---|---|
| 5506 | OLD TIME COUNTRY |
| 5507 | TRADITIONAL COUNTRY |
| 5508 | CLASSIC ROCK |
| 5509 | HARD ROCK |
| 5510 | SMOOTH JAZZ |
| 5511 | WESTERN SWING |

FIG.2

MENU

CHANNELS
JUKEBOX
PREFERENCES — RANDOM
PLAYBACK — SEQUENTIAL
NEW

OPTIONS

- PLAY
- SAVE
- DELETE

NOW PLAYING

ART WORK

JUKEBOX - ALL

| TITLE | ARTIST | GENRE | YEAR | ALBUM | CHANNEL |
|---|---|---|---|---|---|
| ANOTHER BRICK IN THE WALL PT.2 | PINK FLOYD | POP/ROCK | 1979 | THE WALL | 5508 |
| BROWN SUGAR | ROLLING STONES | POP/ROCK | 1971 | STICKY FINGERS | 5508 |
| DON'T LET ME BE THE LAST | BRITNEY SPEARS | POP/ROCK | 2000 | OOPS! I DID IT AGAIN | 5520 |
| FOLSOM PRISON BLUES | JOHNNY CASH | COUNTRY | 1968 | AT FOLSOM PRISON | 5507 |
| HEY YOU | PINK FLOYD | POP/ROCK | 1979 | THE WALL | 5508 |
| JACKSON | JOHNNY CASH | COUNTRY | 1968 | AT FOLSOM PRISON | 5507 |
| MONEY | PINK FLOYD | POP/ROCK | 1973 | DARK SIDE | 5508 |
| TIME | PINK FLOYD | POP/ROCK | 1973 | DARK SIDE | 5508 |
| US AND THEM | PINK FLOYD | POP/ROCK | 1973 | DARK SIDE | 5508 |
| WHERE ARE YOU NOW | BRITNEY SPEARS | POP/ROCK | 2000 | OOPS! I DID IT AGAIN | 5520 |
| WILD HORSES | ROLLING STONES | POP/ROCK | 1971 | STICKY FINGERS | 5508 |

FIG.3

| MENU | OPTIONS 404 | NOW PLAYING | |
|---|---|---|---|
| CHANNELS<br>JUKEBOX<br>PREFERENCES<br>PLAYBACK | • PLAY ALL 408<br>• SAVE ALL 412<br>• DELETE ALL 416<br>• RECORD 420<br>• DO NOT RECORD 424 | ART<br>WORK | |

| | | JUKEBOX - PINK FLOYD | | | | |
|---|---|---|---|---|---|---|
| TITLE | ARTIST | GENRE | YEAR | ALBUM | CHANNEL | |
| ANOTHER BRICK IN THE WALL PT.2 | PINK FLOYD | POP / ROCK | 1979 | THE WALL | 5508 | |
| HEY YOU | PINK FLOYD | POP / ROCK | 1979 | THE WALL | 5508 | |
| MONEY | PINK FLOYD | POP / ROCK | 1979 | DARK SIDE | 5508 | |
| TIME | PINK FLOYD | POP / ROCK | 1979 | DARK SIDE | 5508 | |
| US AND THEM | PINK FLOYD | POP / ROCK | 1979 | DARK SIDE | 5508 | |
| | | | | | | |
| | | | | | | |
| | | | | | | |

DYNAMICALLY UPDATED AUDIO JUKE BOX

TECHNICAL FIELD

Embodiments discussed herein are directed to building a library of audio files that are recorded from one or more audio services based on certain user preferences.

BACKGROUND

Satellite and cable television services typically provide a number of video and audio channels. The audio channels may provide music or other audio content. The audio channels may arranged in a format that includes a number of stations that provide music of a certain type. For example, one station may provide rock and roll music, whereas another station may provide country music. A user may specific musical tastes that include certain songs that would be included in broadcasts from one or more of the audio services. In addition to including songs that a user would enjoying hearing, the various audio services may broadcast or otherwise transmit songs that a user would prefer not to hear.

This mixture of songs that a user likes and songs that a user dislikes may prove to be an inconvenience. Specifically, a user may listen to a particular audio service until the audio service broadcasts or otherwise transmits a song that the user dislikes. At this time the user may search the audio channels until a desirable song is found. As certain satellite and cable television services provide a great number of audio channels, a user may need to change channels frequently.

SUMMARY

Embodiments discussed herein are directed to an apparatus and method for providing a library of audio files. In one embodiment, a receiver records a number of music tracks or other audio files from broadcasts or other transmissions that are sent across a number of channels. The receiver may be operable to receive a number of audio and/or video channels. The audio tracks may be recorded from the audio channels and stored on the receiver, when the receiver is not otherwise being used. In this way, the receiver accumulates a number of audio tracks that may be played back by a user at a convenient time. The receiver may adapt to record certain tracks or channels based on choices made by a user. In certain embodiments, a user may enter one or more preferences that cause the receiver to record certain tracks or channels.

One embodiment is directed to a method of providing a library of audio files in a receiver having at least a signal receiver and a storage device, the receiver operable to receive a number of services from a program service, the method comprising: receiving, through a program service transmission, a first plurality of audio blocks from a plurality of audio services, each audio service including an audio stream and a data stream; temporarily storing the first plurality of audio blocks in the storage device as a plurality of first audio tracks; receiving, through a signal receiver, input indicating a selected audio track, the selected audio track being one of the first audio tracks, the selected audio track being in a first category; receiving, through the program service transmission, a second plurality of audio blocks from the plurality of audio services; temporarily storing the second plurality of audio blocks in the storage device as a plurality of second audio tracks; and automatically saving a first particular audio track of the second audio tracks in the storage device based on the first particular audio track being in the first category.

Another embodiment is directed to a method of providing a library of audio files in a receiver having at least a signal receiver and a storage device, the receiver operable to receive a number of services from a program service, the method comprising: receiving, through a signal receiver, user input indicating a first audio track category; receiving, through a program service transmission, a plurality of audio blocks from one or more audio services, each audio service including an audio stream and a data stream; temporarily storing the plurality of audio blocks in a storage device as a plurality of first audio tracks; automatically saving, in the storage device, a particular audio track of the audio tracks based on the particular audio track being in the first audio track category.

Yet another embodiment is directed to an audio jukebox system, comprising: a receiver operable to receive a program service transmission including one or more audio services; a recorder interconnected with the receiver, the recorder configured to record one or more audio blocks from the audio services; a memory interconnected with the receiver, the memory configured to store a first group of audio tracks contained in the audio blocks; an output device interconnected with the memory, the output device configured to output audio associated with the audio tracks and to display a listing of the audio tracks stored in the memory; and an input device in communication with the receiver, the input device configured to transmit a signal to the receiver to indicate a selection of a first audio track of the first group of audio tracks, the first audio track being in a first category; wherein the receiver is further operable to save a second audio track based on the second audio track being in the first category, the second audio track being in a second group of audio tracks.

BRIEF DESCRIPTION OF THE DRAWINGS

FIG. 2 is an illustration of a graphical user interface that includes a listing of available audio services;

FIG. 3 is an illustration of a graphical user interface that includes a listing of recorded audio tracks;

FIG. 4 is an illustration of a graphical user interface that includes another listing of recorded audio tracks;

DETAILED DESCRIPTION

Embodiments discussed herein are directed to an apparatus and method for providing a library of audio files. In one embodiment, a receiver records a number of music tracks or other audio files from broadcasts or other transmissions that are sent across a number of channels. The receiver may be operable to receive a number of audio and/or video channels. The audio tracks may be recorded from the audio channels and stored on the receiver, when the receiver is not otherwise being used. In this way, the receiver accumulates a number of audio tracks that may be played back by a user at a convenient time. The receiver may adapt to record certain tracks or channels based on choices made by a user. In certain embodiments, a user may enter one or more preferences that cause the receiver to record certain tracks or channels.

As used herein, a "receiver" may be any device capable of receiving video and/or audio content included in a broadcast or other program service transmission from a service provider. For example, a receiver may include a set-top, a cable box, general purpose computer, and so on. As used herein, a service provider may include any service that provides a program service transmission to a receiver such as without limitation, a satellite television service, a direct television service or a cable television service. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Figure 1:
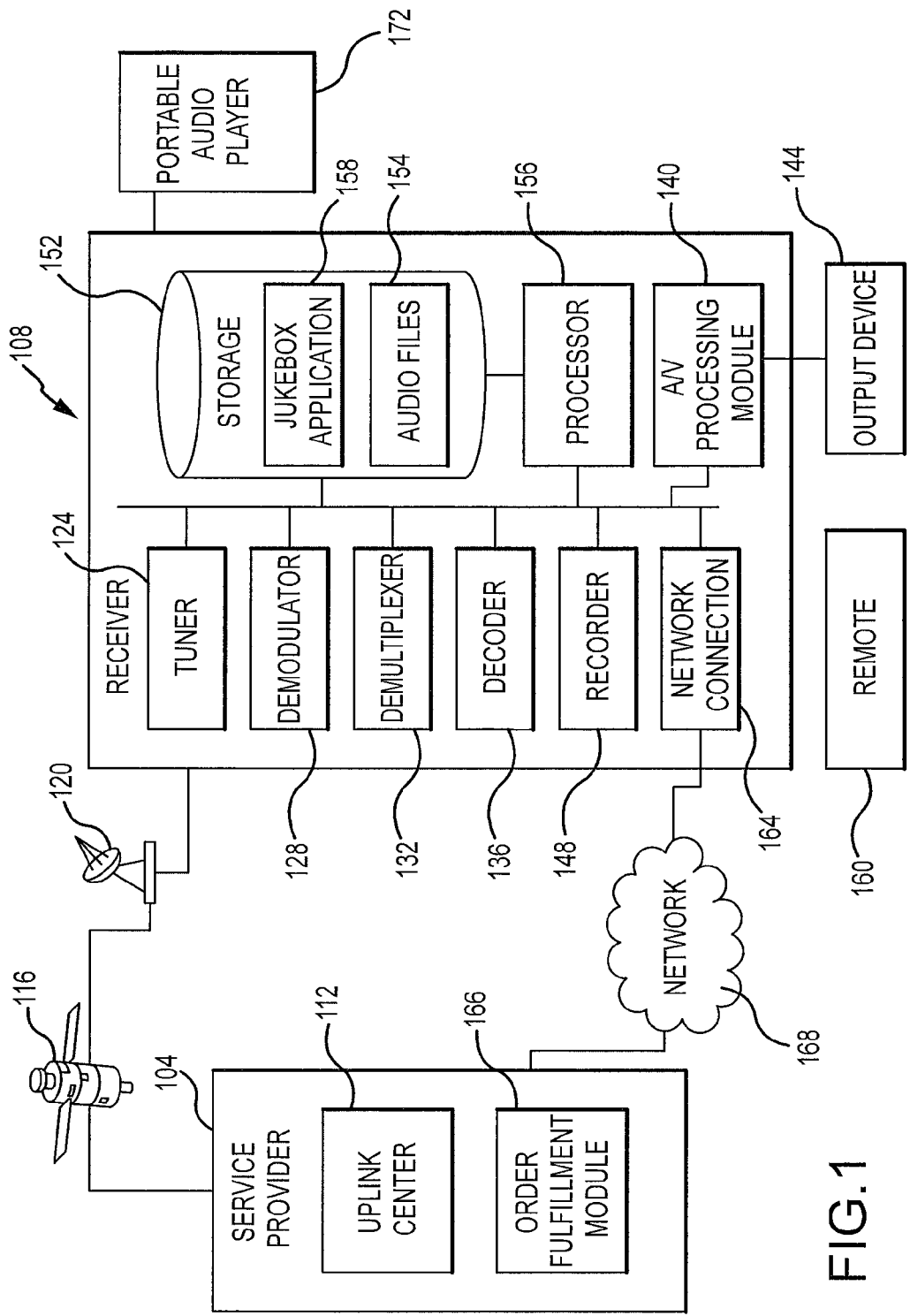
FIG. 1 is a schematic diagram showing components and feature of implementations discussed herein.

FIG. 1 is a schematic illustration of a general operating environment showing components and features of embodiments discussed herein. FIG. 1 includes a service provider 104 that transmits or otherwise provides a program service transmission to a receiver 108. The receiver 108 can include a set-top box (STB), Digital Video Recorder (DVR), a cable receiver, a general purpose computer and so on. A receiver 108 may also include a cable modem that receives streaming audio. The receiver 108 may be associated with an individual, business or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Alternatively, the terms "user" and/or "subscriber" may refer to individuals who have been given access to the program service transmission through promotional offers and/or other non-fee-based agreements. A "subscriber agreement" or a "user agreement" herein refers to an agreement between a service provider and a user that sets forth one or more terms that the user or subscriber agrees to as a condition for using of one or more receivers. No limitations on the form in which the subscriber agreement may take are assumed or implied. In particular, the subscriber or user agreement may be written, verbal and/or implied and so on.

In connection with embodiments that operate in the context of a satellite television service, the service provider 104 may provide a program service transmission through an uplink center 112. Implementations discussed herein may utilize a direct broadcast satellite (DBS) system which can incorporate packetized transmission signals according to an appropriate standard, such as the MPEG-2 standard. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The modulated signal may be transmitted from the satellite 116 over an appropriate frequency band such as, for example, the C-band, the Ku-band or the Ka-band.

Direct broadcast satellite DBS signals may be received as downlinked signals by a satellite antenna 120. The downlinked, L-band signals may be received by a tuner 124, which selects a specific frequency range. The L-band signals received by the tuner 124 may include a number of transponder signals received from one or more satellites 116. A particular transponder signal may include a combination or multiplex of a number of transport streams associated with one or more channels. A particular transport stream may include, for example, compressed or uncompressed audio or visual data. By applying band-pass filtering techniques, the tuner 124 may select a particular transponder signal from the group of signals received from the LNBF.

The transponder signal selected by the tuner 124 may then be demodulated by the demodulator 128. Specifically, the demodulator 128 removes the sinusoidal carrier signal and outputs the information carrying signal as a baseband signal. Output from the demodulator 128 may be directed to a demultiplexer 132. The demultiplexer 132 may be an integrated circuit that accepts the packetized, time domain multiplexed data stream of the MPEG-2 transport stream and routes the packets to various components for further processing. In so doing, the demultiplexer 132 may separate out various transport streams that are contained in a particular transponder signal. A transport stream may include a number of packets having a unique packet identification (PID). In addition to routing packets of data the demultiplexer 132 may also unscramble encrypted data and/or provide buffering of the MPEG data.

A number of transport streams may together form a service. As used herein, a "service" refers to a particular channel which is selected by a user. A particular video channel typically includes three transport streams: a video stream, an audio stream, and a data stream. An audio service, such as a music channel, typically includes two transport streams: an audio stream and a data stream. When a user selects an audio service, for example, the demultiplexer 132 selects the appropriate audio transport stream and routes the audio transport stream to the A/V processing module 140. The A/V processing module 140 may decode, convert and amplify the audio stream, as appropriate, and then send an output audio signal to an output device such as a system speaker. Data from the corresponding data stream associated with the audio service may be captured and used, for example, in displaying information related to the audio output. In connection with audio services that provide music, the data stream may include metadata associated with the currently broadcast track. The metadata may be sent in packets which occur at regular intervals, such as, for example, every half-second, every second or every two seconds. By sending metadata at periodic intervals, a receiver may display current information even if a user tunes to the audio service in the middle of a song. When one song ends and the next song begins, the periodically sent data packets transition from having metadata associated with the first song to metadata associated with the second song.

Output from the demultiplexer 132 may be directed to a decoder 136, which may process the various transport streams that are output from the demultiplexer 132. The decoder 132 may include an audio decompressor portion that is operable to decompress an audio stream, and a video decompressor portion that is operable to decompress a video stream. The audio stream and video stream may be fully compliant audio and video program elementary streams as defined by, for example, ISO 13818-2 and ISO 13818-3 of the MPEG-2 standard, respectively. Output from the decoder 136 may be directed to an audio visual (A/V) processing module 140. The A/V processing module 140 may process the video and audio streams using digital-to-analog conversion techniques or compressed digital to uncompressed digital conversion techniques, to produce one or more output signals. The resulting baseband signals may then be sent to a output device 144 through appropriate connections. By way of example and not limitation, the output device 144 may include a television, a monitor, and/or a speaker system, and so on.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet.

The receiver 108 may include or be associated with a recorder 148, such has a Digital Video Recorder (DVR). The recorder 148 may be integrated into the receiver 108, or it may be a stand alone device. The recorder 148 may be operated by a user who programs the device or receiver function to record a particular program at a specified time. The recorder 148 may be operable to record both video and audio channels or services. When the program occurs, the recorder 148 will record and store the program, which can then be viewed and/or heard by a user at a convenient time. In connection with building a library of audio files, the recorder 148 may record one or more audio tracks from one or more audio services.

The receiver 108 may include or be associated with a memory or other storage device 152, such as magnetic or optical storage. The storage device 152 may be operable to store data received from the decoded satellite signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable in nature. The stored data set may include audio and/or visual content to be transmitted and output through the output device 144. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As an example of still images, the storage device 152 may contain artwork files, such as album covers and the like, that may be displayed concurrently with related audio output.

The storage device 152 may be operable to store one or more audio files 154. The audio files 154 may be recorded from one or more audio services through the operation of the recorder 148. The audio files are stored in the storage device 152 in a manner that identifies individual music or other audio tracks. Specifically, the recorder 148 may processes the continuous audio stream provided by an audio service to identify points in the broadcast that correspond to an end of one song and a beginning of a next song. These transition points in the audio broadcast may be identified, for example, by monitoring the audio stream and identifying a point in the audio stream where the volume falls to substantially zero. In some embodiments, a portion of audio broadcast having no volume may correspond to a transition point between songs. In other embodiments, the data stream may be monitored to determine a point where the metadata transitions from information associated with a particular song to information associated with the next broadcast song. By identifying transition points in the audio broadcast, the recorder 148 may then store the audio in the storage device 152 as separate, individual audio tracks. In one embodiment, each audio track may be stored in a dedicated file. A dedicated file having an individual audio track may be associated with a metadata set or other information regarding the audio track received through the data stream. In certain embodiments, a number of audio tracks may be stored in the storage device 152 together in a single audio file. The single audio file may be a continuous recording of a number of tracks recorded from a particular audio broadcast. The single audio file may be associated with a number of indices that identify transition points between songs or other audio tracks within the audio block. The indices may also be associated with metadata having information regarding the individual songs identified by the indices.

The receiver 108 may additionally include a processor 156 operable to run executable code in connection with various functions associated with the receiver 108. For example, the processor 156 may display graphics, images, animations or other content through the output device 144. The processor 156 may be further operable to recall and display stored content, such as a purchased or recorded audio tracks or programs. The storage device 152 may store an application, file, or other data that is useable by the processor 156. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156. In one instance, a juke box application 158, which is stored in the storage device 152 may be executed by the processor 156 to provide a library of audio files and to output audio through the output device 144.

Among other functions, the juke box application 158 may also receive, store, and/or display a graphical user interface (GUI). The GUI may display a listing of the audio tracks which are stored in the storage device 152 and available for playback by a user. The GUI may provide options to the user for saving and/or deleting certain audio tracks. Additionally, the GUI may provide a screen or portion of a screen which displays a currently playing track. The GUI may also provide a screen or portion of a screen which allows a user to set certain recording preferences. Certain information displayed in the GUI may be acquired from an Electronic Program Guide (EPG) that is received at the receiver 108. The EPG may provide a schedule of program content and/or other features. As used herein, the terms "electronic programming guide" or "EPG" are intended to encompass an interface provided to a user as part of a program service transmission system that includes a schedule of programming content. The EPG may comprise a database or otherwise access a database containing information including, for example, names or titles of viewing or listening events (programs), corresponding channel numbers and names, brief descriptions of the programs, start and finish times, and rating and content information related to the events. In accordance with embodiments discussed herein, certain data regarding available audio channels may be culled from the EPG and displayed in a particular GUI.

The processor 156 may also perform such tasks as executing commands received from a user. User commands may be sent to the receiver 108 through a user input device 160 such as remote or other wireless device. As used herein, a "user input device" may include any device operable to receive input from a user and to convey the input to the receiver 108. In one embodiment, the user input device 160 may be a hand-held device having a number of buttons or keys that when actuated by a user cause the user input device to covey information to the receiver 108 using a suitable communication means, such as an infrared signal. The user input device 160 may include a pointing device or functionality that allows the user to control the position of a cursor that is displayed on the output device 144. For example, the user input device 160 may include a track ball or glide plane that may be manipulated to control cursor movements. The user input device 160 may include a motion sensor or accelerometer that allows a user to control displayed items or graphics, such as a cursor, through movements of his or her hand or arm that cause a displacement of the user input device 160. It should be appreciated that other input devices such as a computer mouse or touch screen may be used and other communication means, wired or wireless, may be used. Information sent to the receiver 108 may include, for example, a command to change the output channel, a command to pause and/or rewind an output program, a command to record a particular program, a command to display a GUI and/or a command to navigate through the GUI. Commands sent to the receiver 108 may be entered through a dedicated display menu. In connection with building and/or using a library of audio files the user input device 160 may be used to enter certain preferences or selected certain audio tracks for playback.

A particular receiver 108 may include a network interface 164. The network interface 164 may be generally operable to communicate or send information across a network 168. In accordance with certain embodiments discussed herein, the network interface 164 may include a modem. Using a modem, the receiver may communication over a network 168 that includes standard telephone lines associated with the public switched telephone network (PSTN). However, it should be appreciated that the network 168 may include any type of network capable of data communication, such as for example, a local or wide area network or the Internet. In this regard, the receiver 108 may communicate through the network interface 164 using any suitable communication protocol such as TCP/IP. Through the network interface 164, a user may communicate with the service provider 104 to change his or her account status including taking such actions as adding or canceling channels and/or ordering pay-per-view content. The network interface may additionally be used to facilitate communication between the receiver and a service that allows a user to purchase music albums and/or individual music tracks. The purchased albums and/or tracks may be transferred to the receiver 108 from an order fulfillment module 166 associated with the service provider 104.

The receiver 108 may be provided in association with a portable music player 172. The portable music player 172 may have a storage device that is operable to store one or more music tracks which are recorded from an audio service by the recorder. The portable music player 172 may attach to the receiver 108 through an appropriate data port or other connection. The receiver 108 may be operable to copy certain audio tracks stored in the storage device 152 onto the portable music player 172. In so doing, the receiver 108 may execute a transcoding operation that translates the audio from an audio codec which is used in connection with the receiver 108 to an audio codec which is used in connection with the portable music player 172. The transcoding operation may be needed due to different audio formats used in the receiver versus formats used in the portable audio player. For example, MPEG-2 layer 1 (or AC3 or ACC) may used as audio format on the receiver 108, whereas MPEG-2 layer 3 may be used on the portable music player 172. Transcoding may be used to translate from the audio codec used on the receiver 108 to the audio codec used on the portable audio player. In other embodiments, transcoding may be used in connection with burning a compact disc or other computer readable medium.

Turning now to an example graphical user interface (GUI) display, reference is made to FIG. 2. In FIG. 2, a GUI display is generally identified with reference number 200. GUI display 200 includes a listing of audio channels that are available at the receiver 108. The information displayed in GUI display 200 may be received as part of an electronic programming guide (EPG) data set. In connection with a jukebox application 158, the GUI display 200 may display the audio channels or services 204 that are available in a specific format. In certain embodiments, a user may select from certain audio services from the GUI display 200. The recorder 148 may then record audio block and/or particular audio tracks from the selected audio services to thereby build a library of audio files. In certain embodiments, a user may not necessarily enter any preferences related to desired audio services. In this instance, the recorder 148 may sample all available audio services to thereby provide a baseline library of audio files. Alternatively or in combination, the receiver may select certain channels to record based on past music track selections made by a user.

In connection with building a library of audio files, a jukebox application 158 in accordance with embodiments discussed herein may record one or more audio blocks from certain channels, such as those listed in the GUI display 200. As used herein, an "audio block" refers to a portion of an audio service recorded by the recorder. An audio block may include one or more individual audio tracks. In certain embodiments, the jukebox application 158 may record audio from the available channels and store one or more audio blocks recorded from each available audio channel. The channels may be cycled through over a period of time in order to acquire audio blocks from each channel. In certain embodiments, a receiver may include a dual tuner. In connection with dual tuner receivers, two audio services may be decoded at a particular time thus resulting in a faster acquisition of a particular number of audio blocks.

The receiver 108 may record audio from the available audio channels when the receiver is not otherwise in use. Specifically, if a user is using the receiver to, for example, watch a live video channel or listen to a live audio channel, the tuner may not be available to record audio blocks. Accordingly, the receiver may record audio blocks when the receiver is otherwise idle, such as during the overnight period. In connection with dual tuner receivers, one tuner may be used to record audio blocks when the other tuner is being used to display and decode a live video or audio channel. The second tuner may be used in this way if it is not otherwise dedicated for use in connection with picture-in-picture functionality or a second television or monitor which may be connected to the receiver 108.

As the audio blocks are recorded, they may be stored as individual audio tracks. The individual audio tracks may be stored in separate files or as indices into a large file containing the entire audio block. A listing of the recorded audio tracks may be provided through a graphical user interface. Such a graphical user interface is displayed in FIG. 3 and is generally identified with reference numeral 300. Graphical user interface display 300 includes a listing of audio tracks 304 which are available for playback by the user. The audio tracks 304 may be categorized by certain attributes such as, for example, title 308, artist 312, genre 316, year 320, album 324, and/or channel 328 on which the track 304 was recorded. The listing of available tracks may be reordered based on selecting a certain category type. For example, selecting the title category may organize the list of available tracks based on, for example, an alphabetical order of titles. Selecting the artist category may cause the list of available artists to be stored in alphabetical order based on artist. Similarly, the list of available tracks may be sorted based on the genre, year, album, or channel. The GUI display 300 may additionally provide an options menu 332 or other mechanism for displaying options to a user. In the options menu 332, a play button 336 may be displayed. By selecting the play button 336, the user may play a certain track listed in the GUI display 300. The metadata associated with the played track may be displayed in a now playing window 340. The now playing window 340 may include artwork 344 associated with the track, artist, or album if artwork is available.

In certain embodiments, the juke box application 158 may store the audio tracks 304 on the storage device 152 in a temporary manner. Specifically, the tracks 304 may be stored from the available audio channels and provided for consideration to the user. The user may decide to save a particular track 304 on the storage device. In the absence of a particular track being explicitly saved by a user, the track may eventually be overwritten by more recently stored audio tracks. In this regard, the options menu 332 may provide a save button 348. By pressing the save button 348, a user may indicate that a certain track is to be permanently saved on the storage device or at least saved on a storage device until otherwise specified by a user. The options menu 332 may additionally include a delete button 352. By selecting the delete button 352, the user may explicitly delete a particular track from the list of available tracks.

In certain embodiments, the jukebox application 158 may record or otherwise monitor which tracks or which type of tracks are saved and/or deleted by a user. In this way, the juke box application 158 may build up or compile a profile of the user's preferred audio tracks or audio track types. The juke box application 158 may use this profile to selectively record certain audio tracks and provide those audio tracks for consideration by the user. Specifically, if the juke box application 158 determines that the user selects one or more tracks from a particular category, additional tracks from this same category may be recorded in the future. For example, if the juke box application 158 determines that the user has selected one or more tracks by a certain artist to be saved on the storage device 152, the juke box application 158 may record additional tracks by the same artist. In recording additional tracks based on a certain category, the juke box application 158 may examine a particular audio block received from a particular channel to determine if the audio block contains any tracks by the designated artist. If these tracks are found, they may be preferentially stored while other tracks may be deleted.

In certain embodiments, the juke box application 158 may record audio from a selected number of the available audio channels based on a user profile that is established based on user selections of individual tracks. By way of example and not limitation, the juke box application 158 may determine that the user selects one or more tracks from a particular genre. In this case, a certain channel or service may be recorded in an attempt to acquire additional tracks which the user may be likely to save or select for being permanently saved on the storage device 152. The user selections may be from a baseline group of tracks that are recorded from all available services in the absence of any known user preferences.

The GUI display 300 may additionally include a number of playback options. The GUI display 300 may include, for example, a random button 356 which, when selected, causes the receiver 108 to play tracks from the list of available audio tracks in a random manner. The GUI display 300 may additionally include a sequential button 360 which, when selected, causes the receiver to play tracks in a sequential manner. In this regard, the receiver 108 may play tracks based on the order that they are listed on, the screen, such as for example, by tile, artist, genre, etc. The GUI display 300 may additionally include a new button 364 which, when selected, may cause the receiver 108 to play certain tracks of the available tracks that have been recently received.

In the GUI 300 shown in FIG. 3, a listing of all available audio tracks is shown. In accordance with certain embodiments, the GUI may be manipulated such that a subset of the available audio tracks is displayed on the output device 144. For example, as shown in FIG. 4, the GUI display 400 shows a listing of available audio tracks by a particular artist. The GUI display 400 may additionally include an options menu 404 providing a number of buttons which may be selected by a user. For example, a user may select play all button 408, which plays all the available tracks displayed in the GUI 400. The options menu 404 may additionally include a save all button 412 which, when selected by a user, causes the receiver 108 to save all of the tracks displayed in the GUI 400. The options menu 404 may include a delete all button 416 which, when selected by a user, causes the receiver 108 to delete all tracks displayed in the GUI 400. The options menu 404 may additionally include a record button 420 that, when selected by a user, may cause the receiver to record tracks which are by the artist displayed on the GUI 400. Similarly, the options menu may include a do not record button 424 which, when selected by a user, causes the receiver to not record tracks associated with the artist shown in the GUI 400.

Figure 5:
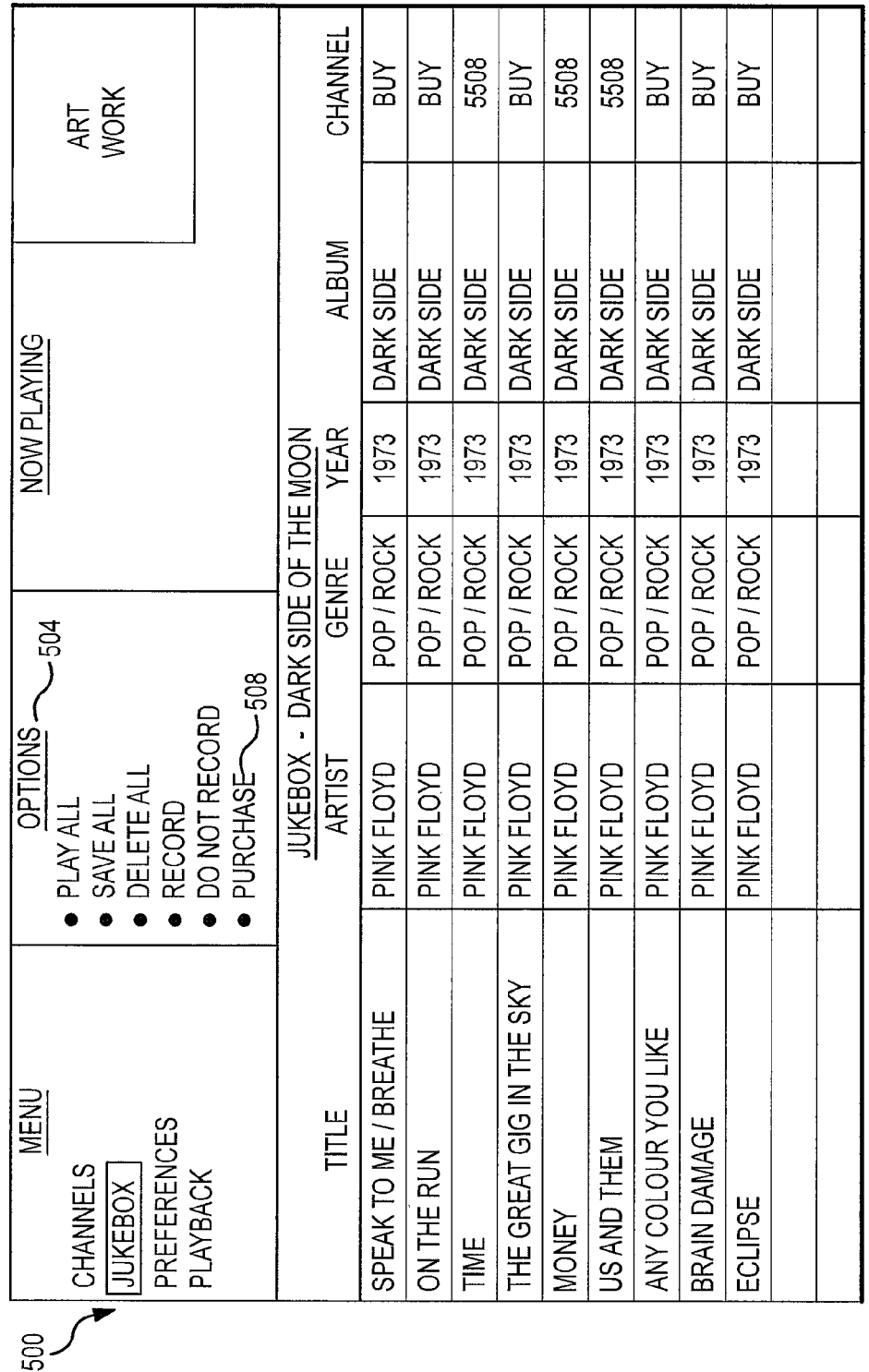
FIG. 5 is an illustration of a graphical user interface that includes still another listing of recorded audio tracks.

In certain embodiments, a GUI may be displayed that includes all tracks which are currently available and which are associated with a particular album. An example of such a GUI is shown in FIG. 5 and is generally identified with reference numeral 500. The GUI 500 shown in may include a listing of tracks that have been recorded from one or more audio services and which are on a particular album. In this or other embodiments, an options menu 504 may be provided which includes a purchase button 508. When selected, the purchase button 508 may cause the receiver 108 to purchase or initiate a process of purchasing the selected album. Specifically, the receiver 108 may purchase the album through an online store by way of a network transaction conducted over the network 168 and through the network connection 164. In connection with purchasing a particular audio track or album, a user may enter his or her credit card number. Alternatively, the terms of the user's subscriber agreement may allow his or her account to be charged for specific purchases.

Figure 6:
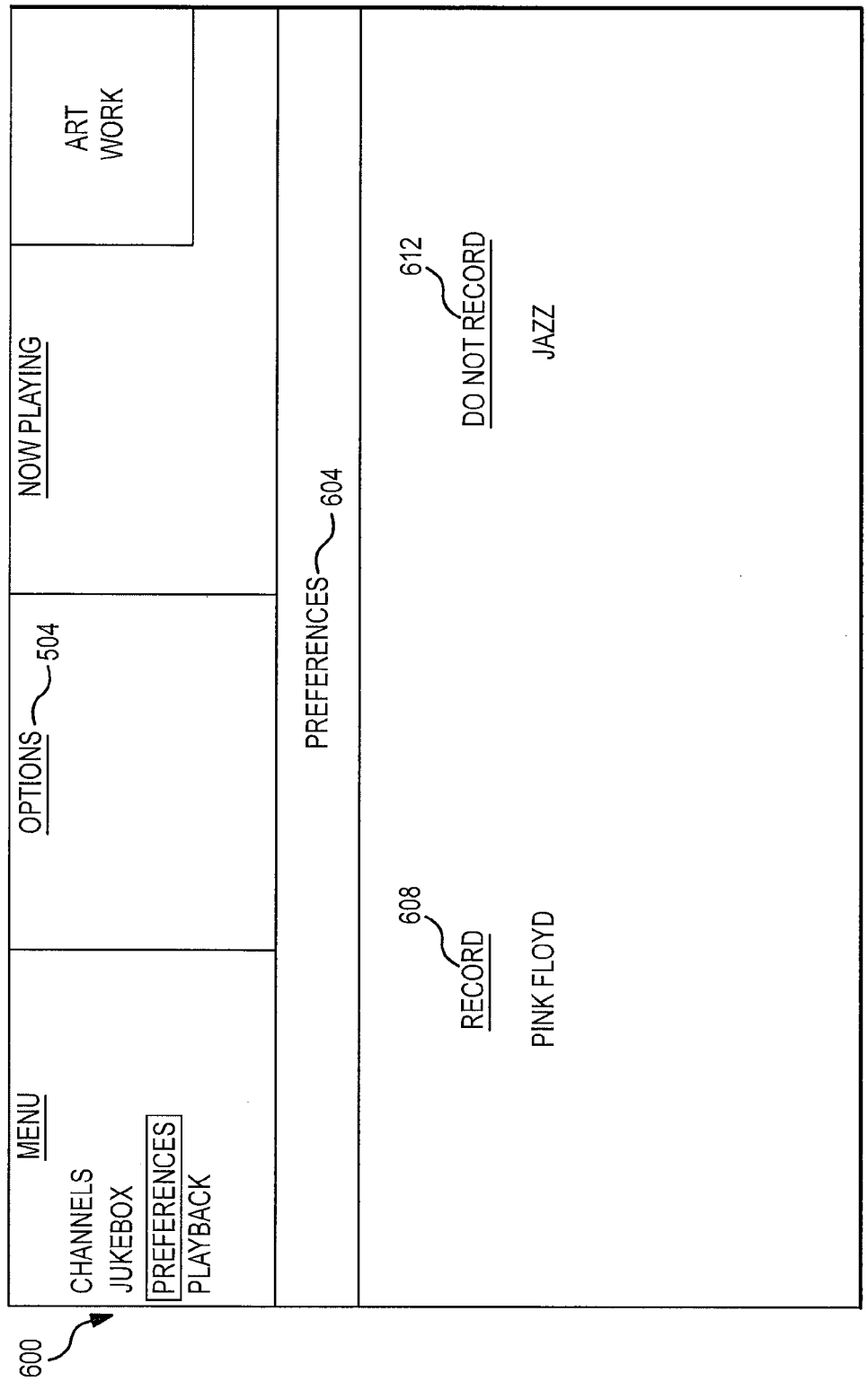
FIG. 6 is an illustration of a graphical user interface that includes a user preferences menu.

FIG. 6 is a GUI display 600 which includes a preferences menu 604. The preferences menu 604 includes a record category 608 and a do not record category 612. In one embodiment, the record category 608 and the do not record category 612 may be automatically populated by the juke box application 158 based on selections of particular tracks made by a user. For example, if a user displays a preference for a certain artist, this artist may be added to the record category 608. Similarly, if over a period of time a user never or very seldomly selects a certain genre or very seldomly selects tracks from a certain channel, these genres or channels may be added to the do not record category 612. In other embodiments, the record category 608 and the do not record category 612 may be populated by user input. Specifically, a user may explicitly specify that a certain track of a certain type should be recorded. The user may enter his or her favorite artists or albums or musical genres. Similarly, the user may enter certain artists, genres, or albums that he does not want to have recorded.

Figure 7:
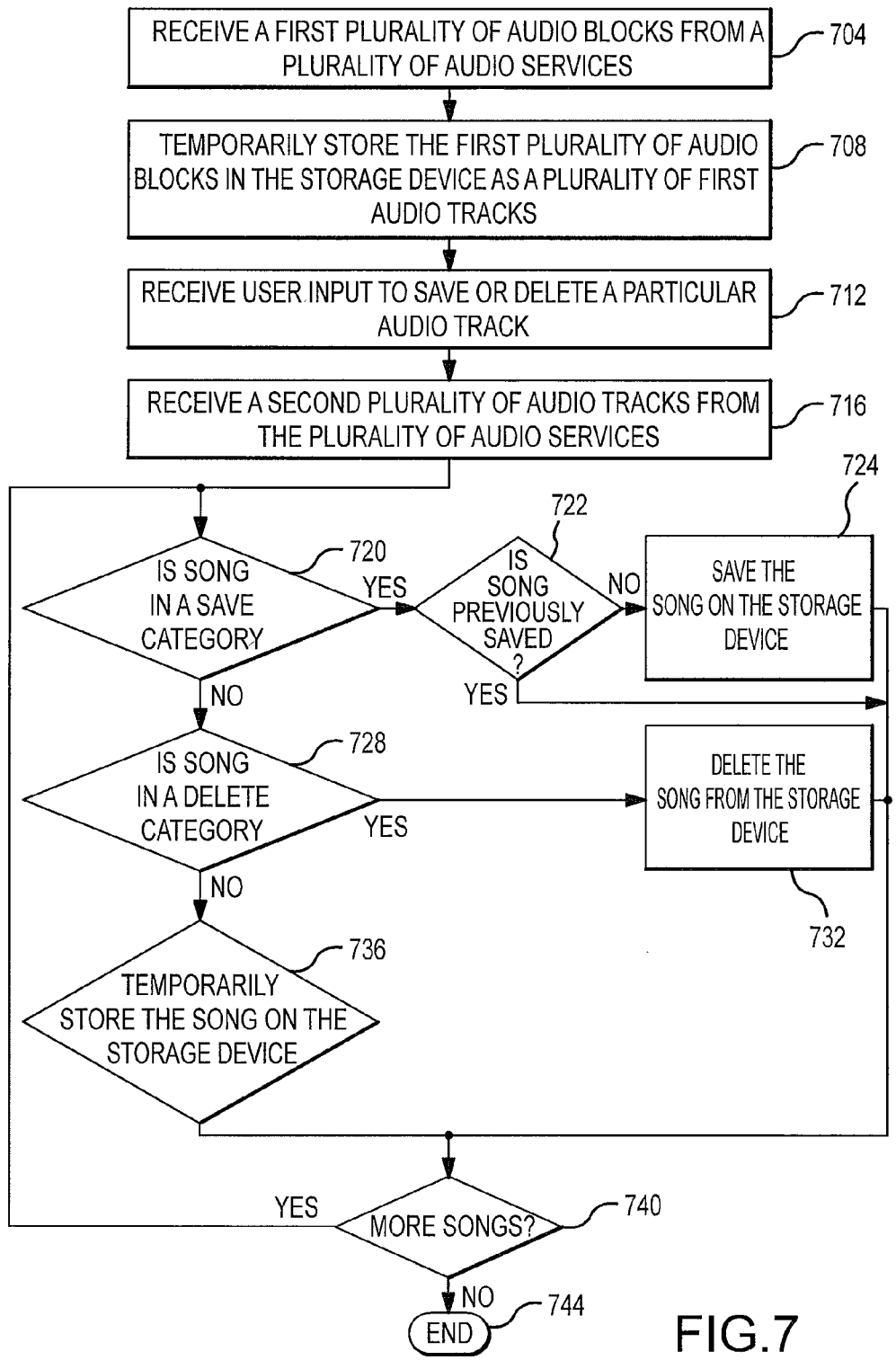
FIG. 7 is flow chart that illustrates a method in accordance with implementations discussed herein.

FIG. 7 is a flowchart illustrating a method in accordance with implementations discussed herein. The method illustrated in FIG. 7 operates to build a library of audio files based on an inferred user profile that is established based on user certain selections from a baseline group of audio tracks. Initially at operation 704, a first group of audio blocks are received at the receiver. Each audio block may be received from a particular audio service. In one embodiment, all available audio services are successively tuned to and a block is recorded therefrom. By recording an audio block from each of the available audio services, a baseline list of available audio tracks may be provided to a user. Following operation 704, operation 708 may be executed. In operation 708, the audio blocks are stored in the storage. As can be appreciated, as each audio block is received by the receiver in operation 704, that particular audio block may be stored in storage at operation 708. The audio blocks may be stored in storage as individual audio tracks. In one embodiment, the individual audio tracks are each stored in a dedicated file. In other embodiments, the entire block is stored in the storage and individual tracks are identified by indices that indicate particular transition points in the audio block. Following operation 708, operation 712 may be executed.

In operation 712, user selections of certain available audio tracks may be received. The available audio tracks may be displayed in a graphical user interface display, which lists the available tracks in appropriate formats, such as, for example, by title, artist, genre, and so on. The user input received in operation 712 may indicate that a particular track should be saved in a permanent manner on the storage device 152. Additionally, the user input may specify that certain tracks should be deleted from the storage device 152. Based on the selections received in operation 712, the receiver may compile a profile of the user's preferences with regard to musical tracks. Following operation 712, operation 716 may be executed.

In operation 716, a second plurality of audio blocks may be received at the receiver. The second plurality of audio blocks may be recorded from certain available audio services. In one embodiment, audio blocks are recorded from all available audio services. In other embodiments, a subset of the available audio services is used to record audio blocks. In this embodiment, the audio services that are chosen by the receiver are based on the inferred user profile which is established in operation 712. Following operation 716, a process may begin wherein individual audio tracks are considered in view of the inferred user profile established in operation 712. Initially following operation 716, operation 720 may be executed.

In operation 720, a determination is made as to whether a particular audio track is in a save category. A save category may include, for example, audio tracks from a certain artist, audio tracks from a certain genre, audio tracks from a certain time period, and so on. If in operation 720 it is determined that the particular audio track is to be saved, operation 722 may be executed. In operation 722, a determination may be made as to whether the audio track has been previously saved. If the audio track has not been previously saved, the audio track may be saved in a permanent manner on the storage device in operation 724. If the audio track has been previously saved, operation 740, may be executed following operation 722. If in operation 724 it is not determined that the audio track is in a save category, operation 728 may be executed.

In operation 728, a determination is made as to whether the particular audio track is in a delete category. The delete category may be specified by the user profile acquired in operation 712 and may specify a particular category. If an audio track falls in a particular delete category, the audio track may be deleted from the storage device in operation 732. For example, the delete category may specify that audio tracks from a particular artist, audio tracks from a particular genre, or audio tracks from a certain time period, and so on, are to be deleted from the storage device 152. Following operation 728, operation 736 may be executed.

In operation 736, the audio track has not been determined to be in either a save or a delete category. In this instance, the audio track may be saved on the storage device in a temporary manner. Specifically, the audio track may be presented in a graphical user interface for consideration by a user. If the user so stipulates, the particular audio track may be saved and/or deleted. If the user does not specify one way or the other, with respect to the audio track, the audio track may eventually be overwritten by more recently acquired audio tracks. Following the operation 724, 732, and 736, operation 740 may be executed.

In operation 740, a determination is made as to whether further songs or audio tracks in the second plurality of audio blocks are to be considered in view of the user profile. If more audio tracks are to be considered, operation 720 may again be executed following operation 740. If at operation 740 it is determined that all audio tracks have been considered in view of the profile, the method may end in operation 744.

Figure 8:
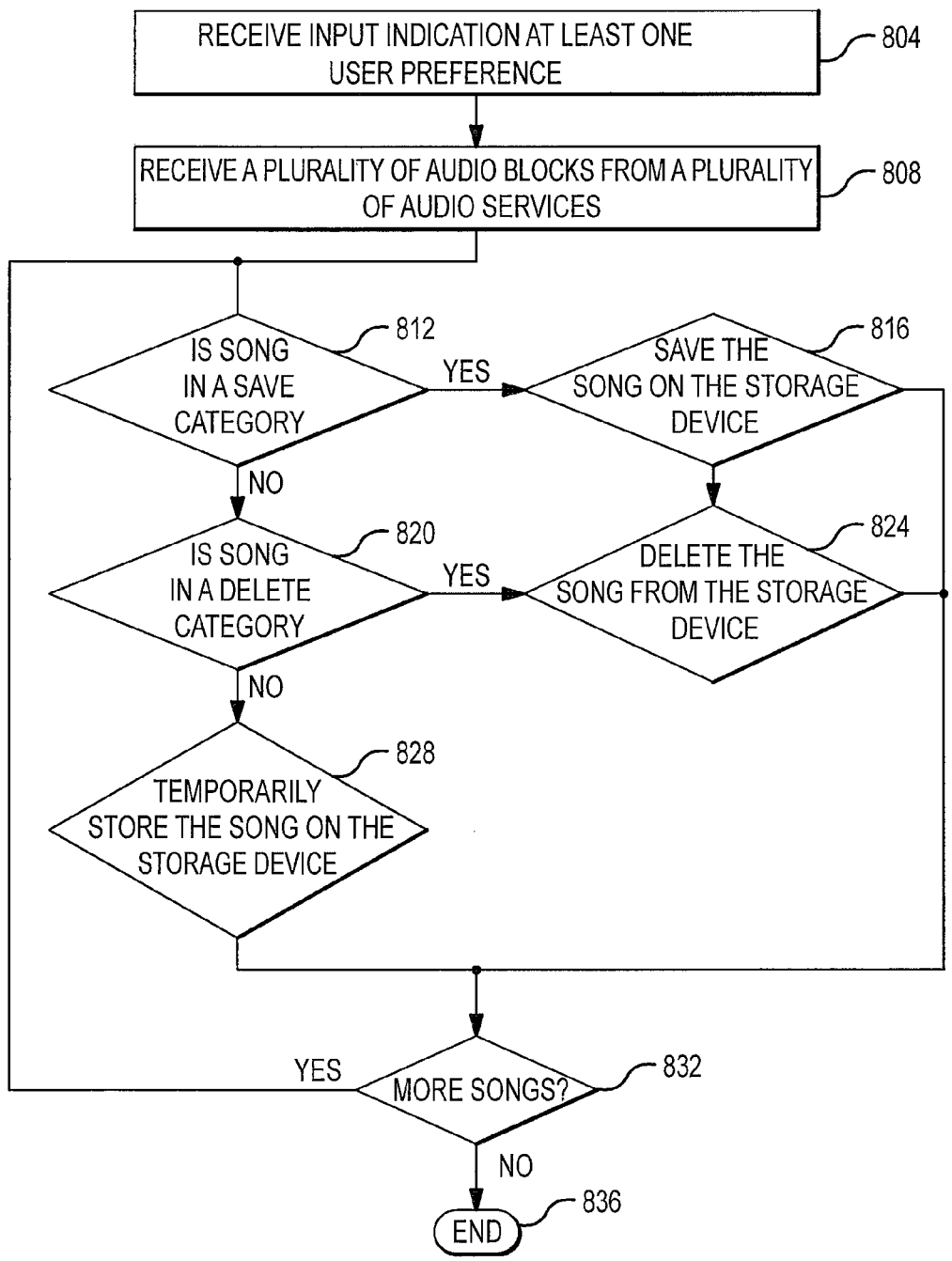
FIG. 8 is flow chart that illustrates another method in accordance with implementations discussed herein.

FIG. 8 is a method in accordance with implementations discussed herein. The method illustrated in FIG. 8 operates to build a library of audio files based on an explicit user profile that is entered by a user. Initially in operation 804, user input may be received to establish a user profile. Specifically, the user may populate such fields as record or do not record, which appear in a graphical user interface such as the GUI display 600 shown in FIG. 6. By way of example and not limitation, the user may specify that certain artists are to be recorded. Additionally, the user may specify that certain genres or certain channels are not to be recorded. Following operation 804, operation 808 may be executed. In operation 808, the receiver may receive a plurality of audio blocks from one or more of the available audio services. The particular audio services selected to be received at the receiver may be selected based on the user profile established in operation 804. Following operation 808, a determination is made based on the user profile of which particular audio tracks within the audio blocks are to be saved, deleted, and/or temporarily saved. Following operation 808, operation 812 may be executed.

In operation 812, a determination is made as to whether a particular audio track is in a save category. A save category may include, for example, audio tracks from a certain artist, audio tracks from a certain genre, audio tracks from a certain time period, and soon. If in operation 812 it is determined that the particular audio track is to be saved, the audio track may be saved in a permanent manner on the storage device in operation 816. If in operation 816 it is not determined that the song is in a save category, operation 820 may be executed.

In operation 820, a determination is made as to whether the particular audio track is in a delete category. The delete category may be specified by the user profile acquired in operation 804 and may specify a particular category. If an audio track falls in a particular delete category, the audio track may be deleted from the storage device in operation 824. For example, the delete category may specify that audio tracks from a particular artist, audio tracks from a particular genre, or audio tracks from a certain time period, and so on, are to be deleted from the storage device. Following operation 820, operation 828 may be executed.

In operation 828, the particular audio track has not been determined to be in either a save or a delete category. In this instance, the audio track may be saved on the storage device in a temporary manner. Specifically, the audio track may be presented in a graphical user interface for consideration by a user. If the user so stipulates, the particular audio track may be saved and/or deleted. If the user does not specify one way or the other, with respect to the particular audio track, the audio track may eventually be overwritten by more recently acquired audio tracks. Following the operation 816, 824, and 828, operation 832 may be executed.

In operation 832, a determination is made as to whether further songs or audio tracks in the second plurality of audio blocks are to be considered in view of the user profile. If more songs are to be considered, operation 812 may again be executed following operation 832. If at operation 832 it is determined that all audio tracks have been considered in view of the profile, the method may end in operation 836.

While embodiments of present invention are discussed herein in connection with the exemplary satellite broadcast system shown in FIG. 1, it should be appreciated that embodiments of the present invention may be used in connection other types of networks or content delivery mechanisms. Generally, the present invention includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can be a web site, a file transfer protocol (FTP) site, a file sharing system or site, and

The invention claimed is:

1. In a receiver having at least a signal receiver and a storage device, a method of providing a library of audio files, the method comprising:
   receiving, through a program service transmission, a first plurality of audio blocks from a plurality of audio services, each audio service including an audio stream and a data stream;
   storing in the storage device, the first plurality of audio blocks as a first plurality of audio tracks, the first plurality of audio tracks having a status of being able to be overwritten by more recently acquired audio tracks;
   presenting on a user interface, as a group, a listing of the first plurality of audio tracks stored in the storage device, the listing presenting the first plurality of audio tracks for consideration by a user;
   receiving, through a signal receiver, a first signal indicating a first input selection from the user on the user interface, the selection being of a first audio track in the listing presented on the user interface, the selected first audio track being in a first category;
   receiving, through the signal receiver, a second signal indicating a second input selection from the user on the user interface, the selection directly causing immediate playing of the selected first audio track;
   receiving, after receiving the first plurality of audio blocks, through the program service transmission, a second plurality of audio blocks from the plurality of audio services;
   storing in the storage device, the second plurality of audio blocks as a second plurality of audio tracks, the second plurality of audio tracks having a status of being able to be overwritten by more recently acquired audio tracks; and
   the receiver saving in the storage device, a first particular audio track of the second plurality of audio tracks with a status of not being able to be overwritten by more recently acquired audio tracks based on the first particular audio track being in the first category, the saved first particular audio track being a part of the library of audio files.

2. The method of claim 1 further comprising:
   receiving from the user, through the signal receiver, a third signal indicating a third input selection from the user on the user interface selecting a second audio track, the selected second audio track being one of the first plurality of audio tracks presented in the listing on the user interface, the selected second audio track being in a second category;
   receiving, through the signal receiver, a fourth signal indicating a fourth input selection from the user on the user interface selecting to delete the selected second audio track; and
   the receiver deleting a second particular audio track of the second plurality of audio tracks based on the second particular audio track being in the second category.

3. The method of claim 1, further comprising:
   storing each audio track as a separate audio file, wherein the audio file is copied from one of the first audio blocks.

4. The method of claim 1, further comprising:
   storing each audio track as an index, the index indicating a location in one of the first audio blocks.

5. The method of claim 1, further comprising:
   identifying blanks in the first audio blocks, the blanks having substantially zero volume; and
   forming the first audio tracks, each first audio track beginning with a particular blank.

6. The method of claim 1, further comprising:
   identifying a plurality of transitions in the data stream, each transition including a change from a first data set to a second data set;
   correlating the transitions in the data stream to transition points in the audio stream; and forming the first audio tracks, each first audio track beginning at a particular transition point.

7. The method of claim 1, wherein the first category is one of: an artist, a genre, a time period or a channel.

8. The method of claim 1, wherein the plurality of audio services include all audio services that are available from a program service transmission.

9. The method of claim 1, wherein the plurality of audio services include a subset of all audio services that are available from a program service transmission, the method further comprising:
   selecting the plurality of audio services based on a likelihood of finding a track that is in the first category.

10. The method of claim 1, further comprising:
    displaying an indication that a related audio track is available for purchase, wherein the related audio track is in the first category;
    receiving a user input indicating a purchase of the related audio track; and
    conducting a network transaction to purchase the related audio track.

11. In a receiver having at least a signal receiver and a storage device, the receiver operable to receive a number of services from a program service, a method of providing a library of audio files, the method comprising:

receiving, through the signal receiver, a first input from a user, the first input indicating a first audio track category;

receiving, through a program service transmission, a plurality of audio blocks from one or more audio services, each audio service including an audio stream and a data stream;

storing the plurality of audio blocks in the storage device as a plurality of audio tracks, the first plurality of audio tracks having a status of being able to be overwritten by more recently acquired audio tracks;

presenting on a user interface, as a group, a listing of the first plurality of audio tracks stored in the storage device, the listing presenting the first plurality of audio tracks for consideration by a user; and the receiver saving, in the storage device, a first particular audio track of the first plurality of audio tracks with a status of not being able to be overwritten by more recently acquired audio tracks based on the first particular audio track being in the first audio track category.

12. The method of claim 11, further comprising:

displaying an indication that a related audio track is available for purchase, wherein the related audio track is in the first category;

receiving a second input selection from the user on the user interface indicating a purchase of the related audio track; and conducting a network transaction to purchase the related audio track.

13. The method of claim 11, further comprising:

receiving a third input selection from the user on the user interface selecting to delete a second audio track, the second audio track being from the listing of the first plurality of audio tracks being presented, the second audio track being in a second category; and the receiver deleting a second particular audio track based on the second particular audio track being in the second category.

14. The method of claim 11, wherein the first category is one of: an artist, a genre, a time period or a channel.

15. The method of claim 11, further comprising:

copying a track to a portable music player.

16. An audio jukebox system, comprising:

a receiver operable to receive a program service transmission including one or more audio services;

a recorder interconnected with the receiver, the recorder configured to record one or more audio blocks from the audio services;

a storage device interconnected with the receiver, the storage device configured to store a first group of audio tracks contained in the audio blocks, the first group of audio tracks having a status of being able to be overwritten by more recently acquired audio tracks;

an output device interconnected with the memory, the output device configured to:

output audio associated with the first group of audio tracks; and display a graphical user interface, the graphical user interface including a listing of the first group of audio tracks stored in the storage device, the listing presenting the audio tracks in the first group for consideration by a user; and an input device in communication with the receiver, the input device configured to transmit a signal to the receiver to indicate a selection on the graphical user interface of a first audio track from the listing of the first group of audio tracks, the first audio track being in a first category, and the input device further configured to transmit a signal to playback the first audio track;

wherein the receiver is further operable to save a second audio track with a status of not being able to be overwritten by more recently acquired audio tracks based on the second audio track being in the first category, the second audio track being in a second group of audio tracks contained in the audio blocks.

17. The audio jukebox system of claim 16, further comprising:

a network connection interconnected to the receiver, the network connection operable to conduct network transactions across a network;

wherein the output device is further configured to display a graphical user interface listing an audio track available for purchase through a network transaction conducted through the network connection, the audio track available for purchase being in the first category.

18. The audio jukebox system of claim 16, wherein the first category is one of: an artist, a genre; a time period or a channel.

19. The audio jukebox system of claim 16, further comprising:

a portable music player detachably connected to the receiver, the receiver being operable to transfer a saved song from the storage device to the portable music player.

* * * * *